(12) United States Patent
Guzman et al.

(10) Patent No.: US 9,143,734 B2
(45) Date of Patent: *Sep. 22, 2015

(54) METHOD AND SYSTEM FOR PROVIDING CONTENT TO A PORTABLE MEDIA PLAYER DEVICE AND MAINTAINING LICENSING RIGHTS

(75) Inventors: Jorge H. Guzman, Gaithersburg, MD (US); Brian D. Jupin, Germantown, MD (US)

(73) Assignee: The DIRECTV Group, Inc., El Segundo, CA (US)

( * ) Notice: Subject to any disclaimer, the term of this patent is extended or adjusted under 35 U.S.C. 154(b) by 1281 days.

This patent is subject to a terminal disclaimer.

(21) Appl. No.: 11/603,879

(22) Filed: Nov. 22, 2006

(65) Prior Publication Data
US 2008/0118231 A1 May 22, 2008

(51) Int. Cl.
| G06Q 99/00 | (2006.01) |
| H04N 7/167 | (2011.01) |
| H04N 21/254 | (2011.01) |
| H04N 21/258 | (2011.01) |
| H04N 21/426 | (2011.01) |
| H04N 21/472 | (2011.01) |
| H04N 21/488 | (2011.01) |
| H04N 21/6334 | (2011.01) |
| H04N 21/658 | (2011.01) |
| H04N 21/81 | (2011.01) |
| G06Q 20/12 | (2012.01) |

(52) U.S. Cl.
CPC ......... *H04N 7/1675* (2013.01); *H04N 21/2541* (2013.01); *H04N 21/2585* (2013.01); *H04N 21/25833* (2013.01); *H04N 21/42669* (2013.01); *H04N 21/47211* (2013.01); *H04N 21/4882* (2013.01); *H04N 21/63345* (2013.01); *H04N 21/6582* (2013.01); *H04N 21/812* (2013.01); *G06Q 20/1235* (2013.01); *G06Q 2220/00* (2013.01); *G06Q 2220/10* (2013.01); *G06Q 2220/18* (2013.01)

(58) Field of Classification Search
CPC .......... G06Q 20/1235; G06Q 2220/00; G06Q 2220/10; G06Q 2220/18
USPC ................................ 705/50, 51, 59
See application file for complete search history.

(56) References Cited

U.S. PATENT DOCUMENTS

| 5,621,456 | A | | 4/1997 | Florin et al. |
| 5,892,900 | A | * | 4/1999 | Ginter et al. ............ 726/26 |
| 6,058,476 | A | | 5/2000 | Matsuzaki et al. |
| 6,618,858 | B1 | | 9/2003 | Gautier |

(Continued)

FOREIGN PATENT DOCUMENTS

| WO | 2005004387 | | 1/2005 | |
| WO | WO 2005004387 A1 | * | 1/2005 | ............ H04L 9/32 |

OTHER PUBLICATIONS

"DIRECTV—Partial Programming Charges & Credits", retrieved from Internet Archive for date Oct. 20, 2006, 3 pages.*

*Primary Examiner* — James D Nigh

(57) ABSTRACT

A method and system for storing a file on a portable device 36 includes a display 30, a digital video recorder 32, a first control device 80 and a controller 200 coupled to the digital video recorder. The controller generates a screen display having a selector for selecting a file to transfer. Upon selecting a file to transfer, storing the file on the portable device 36 and storing license information in a memory 210 of the portable storage device.

15 Claims, 16 Drawing Sheets

(56) References Cited

U.S. PATENT DOCUMENTS

| | | | |
|---|---|---|---|
| 6,721,578 | B2 | 4/2004 | Minear et al. |
| 7,298,845 | B2 | 11/2007 | Tatebayashi et al. |
| 7,509,685 | B2 | 3/2009 | Lambert |
| 7,522,726 | B2 | 4/2009 | Ishiguro et al. |
| 7,987,491 | B2 * | 7/2011 | Reisman ............... 725/112 |
| 8,011,015 | B2 * | 8/2011 | Singer et al. ............ 726/31 |
| 8,875,206 | B2 * | 10/2014 | Guzman et al. .......... 725/109 |
| 2001/0056575 | A1 | 12/2001 | Wei et al. |
| 2002/0085588 | A1 | 7/2002 | Giaccherini et al. |
| 2003/0003899 | A1 | 1/2003 | Tashiro et al. |
| 2003/0056211 | A1 | 3/2003 | Van Den Heuvel |
| 2004/0031058 | A1 * | 2/2004 | Reisman ............... 725/112 |
| 2004/0039648 | A1 | 2/2004 | Candelore et al. |
| 2004/0075555 | A1 | 4/2004 | Gantman |
| 2004/0117619 | A1 * | 6/2004 | Singer et al. ........... 713/156 |
| 2004/0117834 | A1 | 6/2004 | Karaoguz et al. |
| 2004/0268117 | A1 | 12/2004 | Olivier et al. |
| 2005/0004873 | A1 | 1/2005 | Pou et al. |
| 2005/0021942 | A1 * | 1/2005 | Diehl et al. ............ 713/158 |
| 2006/0020960 | A1 | 1/2006 | Relan et al. |
| 2006/0031883 | A1 | 2/2006 | Ellis et al. |
| 2006/0101498 | A1 | 5/2006 | Arling et al. |
| 2006/0172700 | A1 | 8/2006 | Wu |
| 2006/0236097 | A1 | 10/2006 | Prologo et al. |
| 2007/0044132 | A1 * | 2/2007 | Kubo et al. ............. 725/116 |
| 2007/0294526 | A1 * | 12/2007 | Medvinsky et al. ...... 713/158 |
| 2008/0034440 | A1 | 2/2008 | Holtzman et al. |
| 2008/0127257 | A1 | 5/2008 | Kvache |
| 2009/0064341 | A1 * | 3/2009 | Hartung et al. ......... 726/27 |
| 2009/0210701 | A1 | 8/2009 | Zhang et al. |

* cited by examiner

METHOD AND SYSTEM FOR PROVIDING CONTENT TO A PORTABLE MEDIA PLAYER DEVICE AND MAINTAINING LICENSING RIGHTS

CROSS-REFERENCES TO RELATED APPLICATIONS

This application is related to Utility application Ser. No. 11/603,632, filed Nov. 22, 2006, issued Oct. 28, 2014 as U.S. Pat. No. 8,875,206, entitled "Method and System for Securely Providing Content to a Portable Media Player Device"; Ser. No. 11/603,743, filed Nov. 22, 2006, issued Jan. 31, 2012 as U.S. Pat. No. 8,107,626 entitled "Method and System for Enabling Transfer of Content Between a Storage Device and a Portable Media Player Device"; Ser. No. 11/603,788, filed Nov. 22, 2006, entitled "Separation of Content Types on a Portable Media Player Device"; Ser. No. 11/603,878, filed Nov. 22, 2006, entitled "Method and System for Updating File Segments of Content on a Portable Media Player Device"; and Ser. No. 11/603,768, filed Nov. 22, 2006, issued Jun. 29, 2010 as U.S. Pat. No. 7,747,703 entitled "Method and System for Targeted Marketing to a Portable Media Player Device Owner", filed simultaneously herewith. The disclosures of the above applications are incorporated by reference herein.

TECHNICAL FIELD

The present disclosure sets forth a method for storing information in a portable media player or other portable or mobile device from a content storage device and more specifically for a system and method of maintaining the licensing rights for a portable device.

BACKGROUND

Satellite television has become increasingly popular due to its wide variety of programming. Current DirecTV systems employ an antenna that is fixed to a structure. The antenna is pointed once and secured into place. Typically a set top box includes a digital video recorder for recording various programs. To play the content on another television requires the physical movement of the set top box to another television. This is inconvenient and, thus, is hardly ever performed.

Portable media players have increased in popularity over the years. Portable media players record content, typically from the internet, for playback through the portable media device. An example of a portable media player includes an MP3 player. More recently, memory for such devices has increased while the cost of the memory has been reduced. Portable media players now are capable of storing and playing back video content recorded from the internet through a personal computer or the like.

Content on a digital video recorder is already in a digital format and, thus, it would be convenient for users to be able to use the stored content on a mobile or portable media player. However, it is desirable to prevent unauthorized use of the content stored on the portable or mobile media device.

It would therefore be desirable to provide a method and apparatus for allowing satellite television video and audio files to be played back on a portable media player while protecting the rights of content owners.

SUMMARY

The present disclosure allows a portable media player to playback files loaded from a storage device in a set top box (IRD). The storage device may be a digital video recorder (DVR).

In one aspect of the disclosure, a method includes coupling a portable device to a storage device separate from the portable device at a first time, storing a file on the portable device from the storage device, storing a license expiration time on the portable device, coupling the portable player to the storage device at a second time after the first time, and updating the license expiration time.

In another aspect of the disclosure, a method includes storing the file on a portable device from a storage device, storing a license expiration time for the file on the portable device, and, when the license time has expired, disabling access to the file.

In yet another aspect of the disclosure, a system for storing a file on a portable device includes a display, a digital video recorder and a first control device and a controller coupled to the digital video recorder. The controller generates a screen display having a selector for selecting a file to transfer, wherein upon selecting a file to transfer, storing the file on the portable device and storing license information on the portable storage device.

One advantage of the disclosure is that broadcasters' rights may be maintained as well as providing security to the system.

Other advantages and features of the present disclosure will become apparent when viewed in light of the detailed description of the preferred embodiment when taken in conjunction with the attached drawings and appended claims.

DETAILED DESCRIPTION

Figure 1:
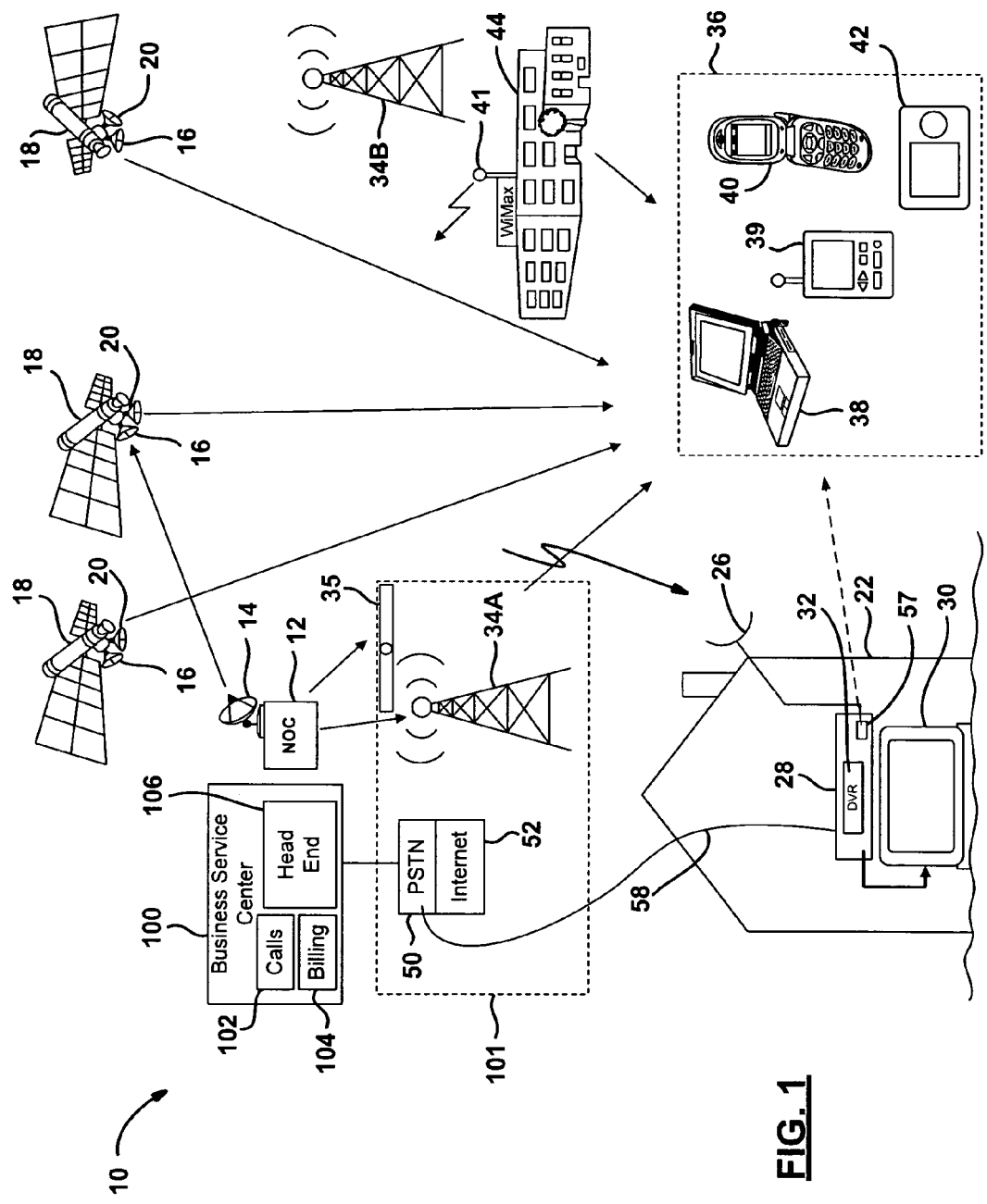
FIG. 1 is a system level view of a satellite broadcasting system according to the present disclosure.

In the following figures the same reference numerals will be used for the same views. The following figures are described with respect to a portable media player for use with a satellite television system. However, those skilled in the art will recognize the teachings of the present disclosure may be applied to various types of devices and different methods to communicate. The present disclosure may be used for audio files, video files or both. The system is also suitable for use with a storage device alone or in combination with a receiving device for a cable, terrestrial over-the-air system, satellite or stratospheric broadcast system.

Referring now to FIG. 1, a television broadcasting system 10 is illustrated. The television broadcasting system 10 includes a network operations center 12 that generates wireless signals through a transmitting antenna 14 which are received by a receiving antenna 16 of satellites 18. The wireless signals, for example, may be digital, audio, digital video, or digital information signals. A transmitting antenna 20 generates signals directed to various receiving systems including stationary systems such as those in a home 22. The wireless signals may have various types of information associated with them including location information. The wireless signals may also have various video and audio information associated therewith. A receiving antenna 26 receives the wireless signals from the satellite 18 and processes the signals in a receiving unit or set top box 28. The set top box 28 terminology will be used as an example throughout the disclosure but may be used interchangeably with the receiving unit.

Towers 34A and 34B may be used by the system 10 to provide various information or content signals to the set top box 28. The towers 34A, 34B may be used for terrestrial television broadcasting. The towers 34A, 34B may be cellular towers for broadcasting through a cellular system.

A stratospheric platform 35 may also be used in the system for distributing content, by broadcasting in place of or in addition to the satellite, towers or terrestrial system. The stratospheric platform 35 may be manned or unmanned and fly between fifty thousand and one-hundred thousand feet above the surface of the earth, well below even low earth orbit satellites. Various content and information may be distributed or broadcast from the stratospheric platform 35. The stratospheric platform 35 may also provide a return path from the set top box 28 to the network operation center 12.

The present disclosure may be used for displaying various wireless information on a portable device 36 such as a laptop computer 38, a personal digital assistant 39, a cellular telephone 40 or a portable media player 42. It should be noted that these devices may also receive wireless signals having various types of information associated therewith from the cellular towers 34A and 34B. Other types of information may be broadcast from various other types of broadcasting areas such as an antenna 41 on a building 44. The building 44 may be various types of buildings such as a store and the wireless information transmitted from the antenna 41 may be advertising information.

The building or home 22 is illustrated having a fixed antenna 26. The fixed antenna 26 is coupled to the set top box 28. The set top box 28 may also be referred to as an integrated receiver decoder. The set top box 28 receives the received signals through the antenna 26 and converts them into audio and video files to be played on television monitor 30. The set top box 28 may include a digital video recorder 32. The received signals may be satellite, stratospheric or terrestrial-based signals. The received signals may also be received from a cable in a cable-television based system.

The set top box 28 may be coupled to a communication line 58 such as a telephone line which in turn is coupled to the public service telephone network 50 and which may also be coupled to the Internet 52. The telephone line may be used to grant conditional access and provide a means to place callbacks from the receiving device. The communication line 58 may also be a cable television line used to deliver content to the set top box 28. The set top box 28 may also include a transmitter 57 that is used to communicate with one or more of the portable devices 36. As will be described below, various signals including content, conditional access signals, keys and authorizations from the DVR 32 may be transferred through the transmitter 57 to the portable device 36. The transmitter 57 may be an RF infrared, Bluetooth, WiFi, Ethernet, WiMax or WiMax mobile transmitter. It should be noted that the transmitter 57 may be a wireless or wired connection to the portable device 36.

A central location such as a business service center 100 may be coupled to a communication system 101 which may include the public service telephone network (PSTN) 50, cellular tower 34, stratospheric platform 35 or the internet 52 preferably though a broadband system. The business service center 100 is typically used in a DirecTV-type system for billing, Pay-Per-View and interactive programming. The business center 100 may receive requests or calls 102 and provide billing services 104. The business service center 100 may also act as a head end 106 coupled to network operation center 12. The business service center 100 may allow household keys to be stored on the set top box 28. A second household key may be provided to the portable device 36. When content is transferred from the set top box 28 to the portable device 36, the keys must match to allow playback. Thus, only mobile receivers associated with or belonging to the customers of the particular set top box or boxes 28 are allowed playback of the particular audio and video files. The business center 100 or head end 106 may receive call-back signals allow authorizations to view pay per view, for interactive services, for gaming and the like. The business center 100 or head end 20 may also provide call in to grant authorizations and provide the system with other information signals.

Figure 2:
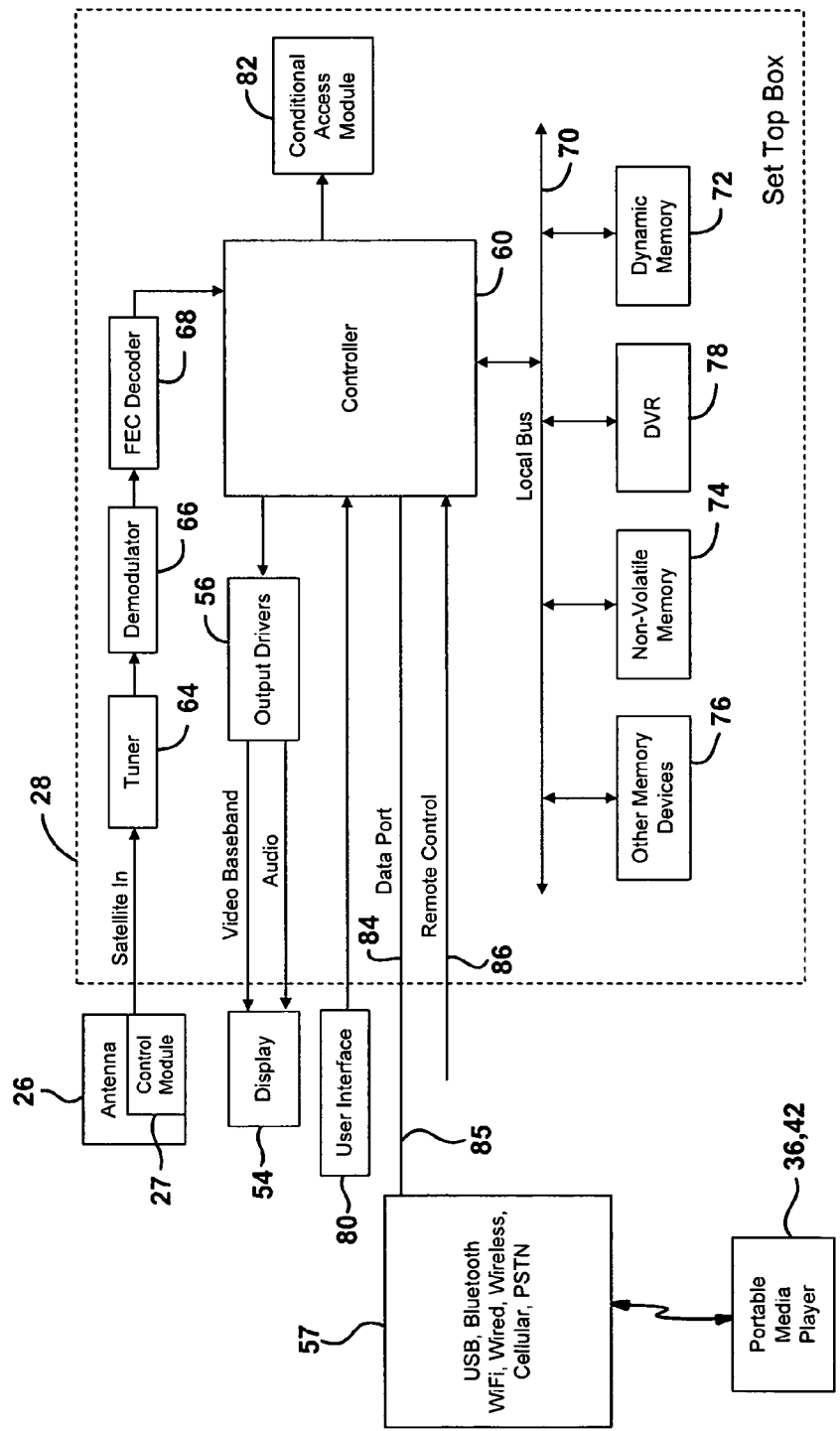
FIG. 2 is a block diagrammatic view of a receiving system according to the present disclosure.

Referring now to FIG. 2, a set top box 28 is illustrated in further detail. Antenna 26 may be various types of antennas including a stationary, omni-directional moving or rotating antenna which is used to switch to another satellite or to track the relative movement of the satellite should the satellites be lower earth orbit satellites than a geostationary satellite. The antenna 26 may be a single antenna used for satellite television reception. The antenna 26 may also be an electronic antenna. The antenna 26 may two-way communicate information to the set top box 28 such as tuning information.

The antenna 26 may include a control module 27 that controls the communication with the set top box 28. During operation, the control module 27 generates various types of signals such as information regarding the antenna, timing information and the like as will be described below.

The antenna 26 may be replaced with a cable television connection or a terrestrial antenna or a combination thereof depending on the type of system.

The set top box 28 includes a display 54. The display 54 may be incorporated into the set top box 28 or by providing by separate monitor or television 30 from FIG. 1. The display 54 may include output drivers 56 used for generating the desired audio and video outputs suitable for the particular display 54.

A controller 60 may be a general processor such as a microprocessor. The controller 60 may be used to coordinate and control the various functions of the set top box 28. These functions may include a tuner 64, a demodulator 66, a forward error correction decoder 68 and any buffers and other functions. The tuner 64 receives the signal or data from the individual channel. The demodulator 66 demodulates the signal or data to form a demodulated signal or data. The decoder 68 decodes the demodulated signal to form decoded data or a decoded signal. The controller 60 may be similar to that found in current DirecTV set top boxes which employ a chip-based multifunctional controller.

The controller 60 may include or be coupled to a local bus 70. The local bus 70 may be used to couple a dynamic memory 72 such as RAM which changes often and whose contents may be lost upon the interruption of power or boot up. The bus 70 may also be coupled to a non-volatile memory 74. The non-volatile memory 74 may be an in-circuit programmable type memory. One example of a non-volatile memory 74 is an EEPROM. One specific type of EEPROM is flash memory. Flash memory is suitable since it is sectored into blocks of data segments that may be individually erased and rewritten.

Other memory devices 76 may also be coupled to local bus 70. The other memory devices may include other types of dynamic memory, non-volatile memory, or may include such devices such as a digital video recorder 78. The display 54 may be changed under the control of controller 60 in response to the data in the dynamic memory 72 or non-volatile memory 74. A storage device such as digital video recorder 78 may be coupled within the set top box 28. Several embodiments below may use a storage device alone.

The controller 60 may also be coupled to a user interface 80. User interface 80 may be various types of user interfaces such as a keyboard, push buttons, a touch screen, a voice activated interface, or the like. User interface 80 may be used to select a channel, select various information, change the volume, change the display appearance, initiate or file transfer, select a file, or other functions. The user interface 80 is illustrated as part of the set top box 28. The user interface 80 may be located external to the set top box 28 such as dial buttons, voice activated system, or the like incorporated into another device such as a television.

A remote control 86 may be used as one type of interface device. The remote control 86 provides various data to the controller 60.

A conditional access module 82 (CAM) may also be incorporated into the receiving unit. Access cards or modules such as conditional access module (CAM) cards are typically found in DirecTV units. The conditional access module 82 may provide conditional access to various channels and wireless signals generated by the system. Not having an access card or not having an up-to-date access module 82 may prevent the user from receiving or displaying various content from the system.

An external data port 84 may be coupled to the controller 60 for transmitting or receiving information from the portable device 36 such as the portable media player 42. The set top box 28 is illustrated having a data port 84 coupled to the portable media player through the interface 57 may in be included in the set top box. The set top box may include various device controllers or drivers to form various types of connections not limited to a USB, Bluetooth, WiFi, WiMax wired, infrared, Ethernet, wireless, cellular, RS232, serial port, parallel port or PSTN connection to the portable media player 42. The data port 84 provides two-way communication through a two-way communication line 85.

Figure 3:
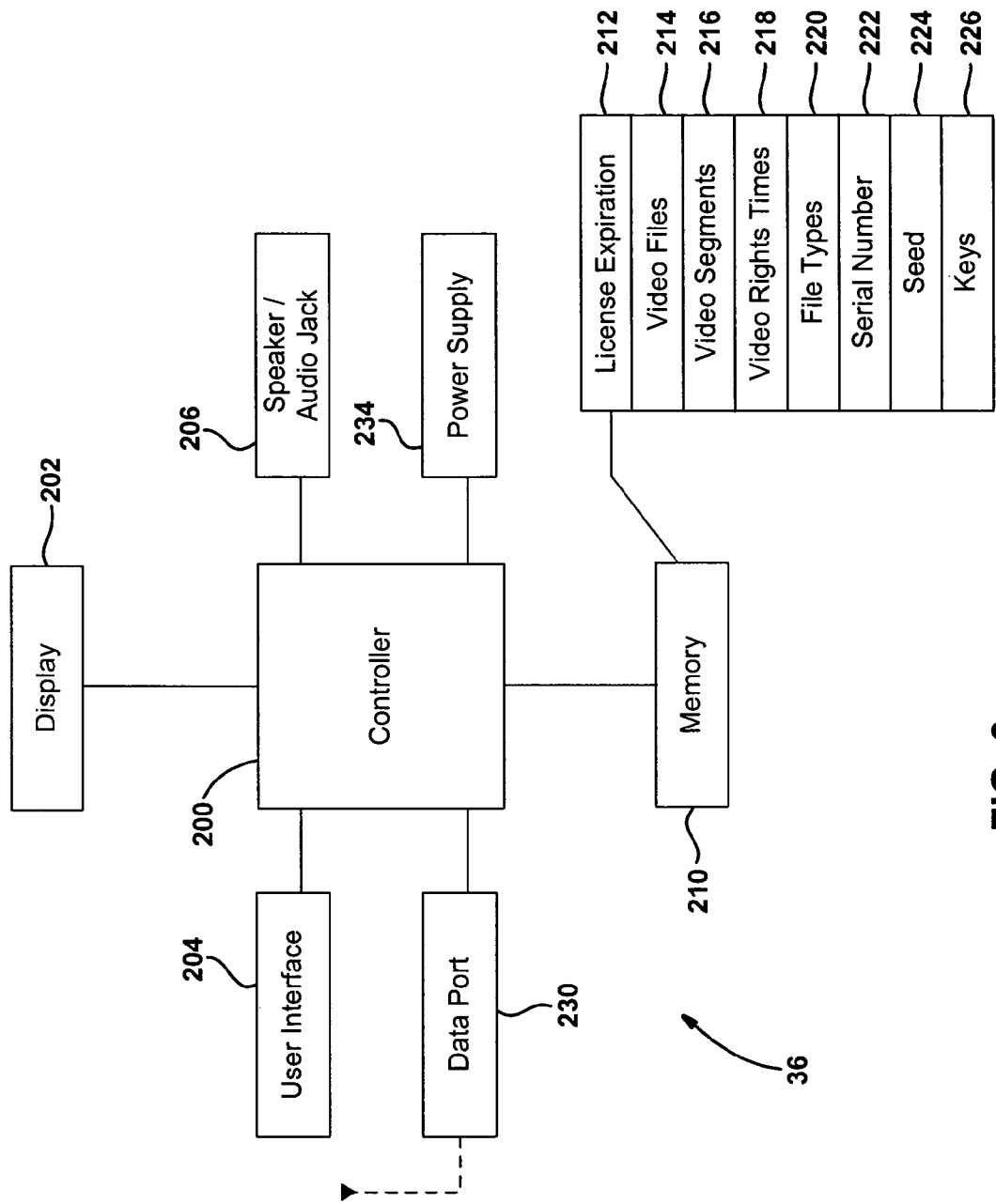
FIG. 3 is a block diagram of a portable media player.

Referring now to FIG. 3, a block diagrammatic view of a portable device 36 is illustrated. As would be evident, the portable device 36 may perform other functions such as computing in the case of a personal computer or calendar events in the case of a personal digital assistant. The block diagram presented in FIG. 3 applies to the function set forth in the disclosure that is in addition to any other functions such a device may perform.

Portable device 36 includes a controller 200 that is coupled to a display 202 that may be part of or separate from the device. The display 202 may, for example, be a screen.

Controller 200 is also coupled to a user interface 204. The user interface 204 may be various types of user interfaces including buttons, dials, slides or a touch screen. One example shown in the next figure is a plurality of arrow key buttons for moving a cursor on the display 202. For the case of a touch screen, the user interface and the display are combined as one. The controller 200 also includes a speaker or audio jack 206. The speaker or audio jack 206 plays the audio signals from the controller 200.

The controller 200 is also in communication with a memory 210. The memory 210 may be a single memory device or a number of memory devices. The memory 210 may include, but is not limited to, a hard disk drive, flash memory, RAM, ROM, non-volatile memory, dynamic memory, or various other types of memory. Various combinations of types of memory may be used. The memory 210 may be used to store various information including license expiration 212, video files 214, video segments 216, video rights times 218, file types 220, a serial number 222, a seed 224, encryption keys 226, or the like.

The controller 200 may also be coupled to a data port 230. The data port 230 may be various types of data ports including an antenna for wirelessly receiving information, an infrared port for infrared transmission of information, or a direct electrical connection such as, but not limited to, a USB connection, an Ethernet connection, parallel port, serial port or RS232 connection. Various formats may be used such as Bluetooth, WiFi, WiMax, wired, cellular, serial port, parallel port, or the like.

The data port 230 may be a single direction input port. However, the data port 230 for the examples below is a two-way communication port so the portable device 36 may communicate with the receiving device 28 of FIG. 2. Two-way is used to increase the security of the system.

The controller 200 may also be coupled to a power supply 234. The power supply 234 may be a battery, AC, solar, or fuel cell. Of course, various other types of power supplies could be used.

The controller 200 may be used to perform various communication functions such as transmitting information, encoding/decoding, encrypting/decrypting, playing back, monitoring license rights, communicating with the set top box, storing information to the memory 210, retrieving information from the memory 210, controlling file structures and other control functions.

Figure 4:
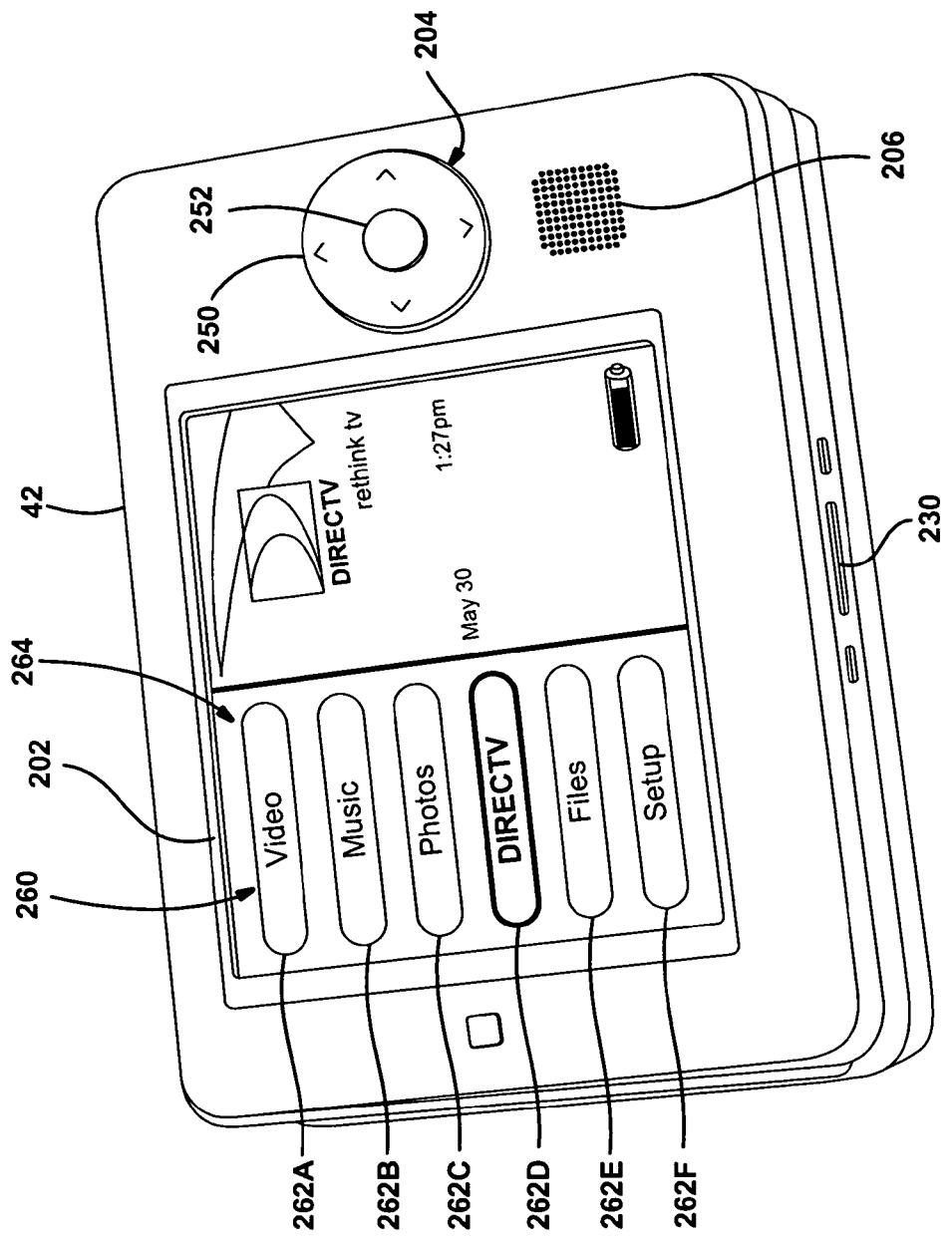
FIG. 4 is a perspective view of a portable media player having a top level menu for selecting various content.

Referring now to FIG. 4, a perspective view of the portable media player 42 is illustrated. Many of the elements of FIG. 3 described above are illustrated including the display 202, the user interface 204 that includes arrow buttons 250 and a select button 252. A speaker 206 is also illustrated along with a data port 230.

Display 202 includes a graphical user interface 260. The graphical user interface 260 includes a plurality of icons 262A-262F. The icons 262A-F represent a top level menu 264. The first icon 262A is a video icon, the second icon 262B is a music icon. Icon 262C is a photo icon, icon 262D is a brand icon such as a DirecTV icon. Icon 262E is a file icon, and icon 262F is a set-up icon. The types of files may be categorized and saved under the corresponding icon. The files may have different formats. A first format may be used for the DirecTV video and/or audio files that is different than any of the other types of formats stored under the other icons. Video files may have several different formats of which only the DirecTV-specific format is under the icon 262D.

The files under each icon may be selected using the user interface 204 such as the arrow selector 250 and a select button 252. As is illustrated, the DirecTV menu is highlighted. An implementation may use bolding to indicate the selection, a change of colors of the selected area, underlining or other types of an indication.

Figure 5:
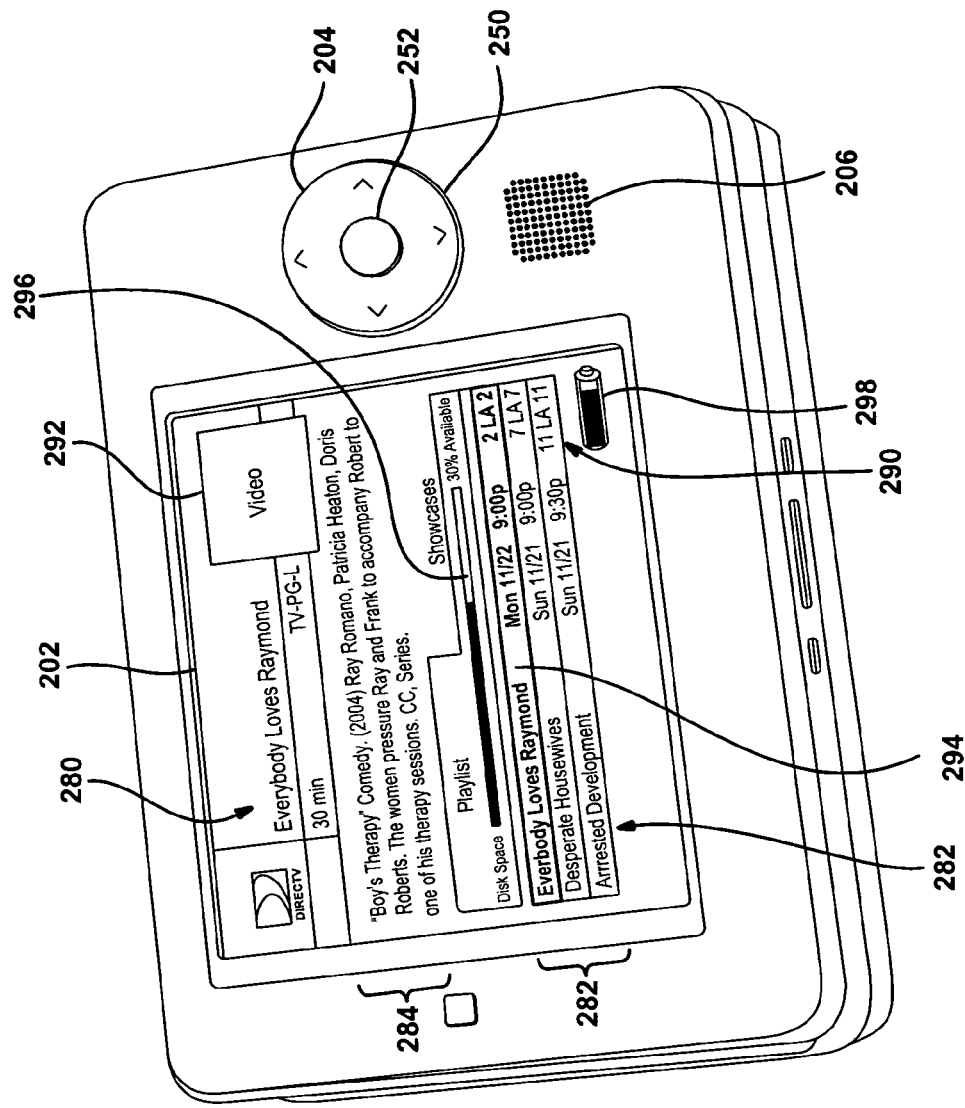
FIG. 5 is a perspective view of a portable media player having a DIRECTV brand menu displayed content.

Referring now to FIG. 5, the screen display 202 has a display corresponding to the icon selection 262D. That is, selection of the icon 262D brings screen display 280 onto the display 202. The screen display 280 includes a list of files 282 stored thereon. Other information may also be displayed including the time 286 and date 288 that the program was recorded. A channel descriptor 290 may also be displayed that illustrates the channel from which the show was recorded.

The display 280 may also include a video display area 292 that displays a portion of the show or file selected. In this instance, the icon 294 is selected. It is illustrated as a different color or shading than the remaining files.

A space available on the disk is displayed on disk or memory space display 296. A battery life indicator 298 provides an indicator as to the remaining battery life of the device.

Figure 6:
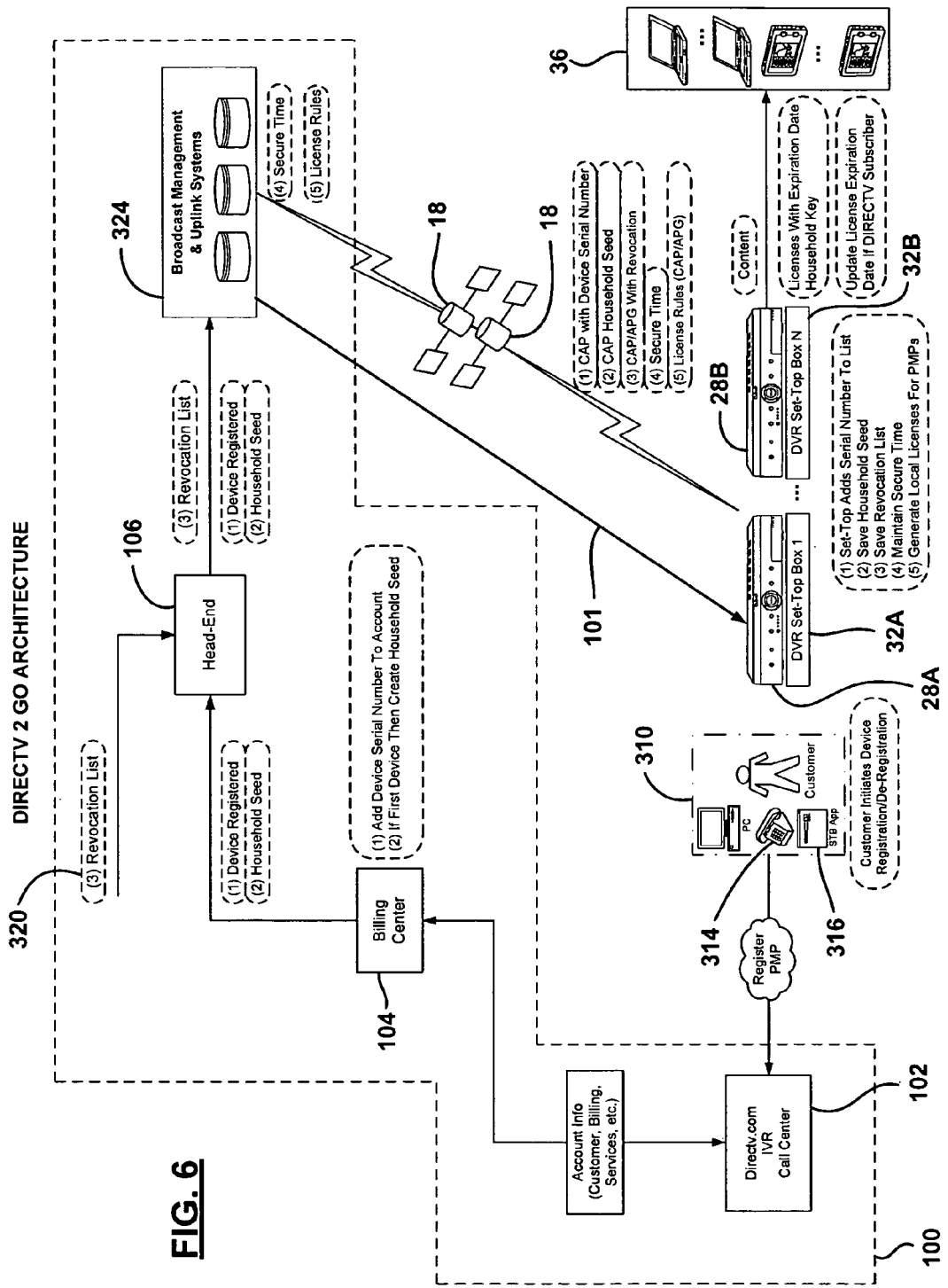
FIG. 6 is a system level view of a system for authorizing a portable device to be used in the system.

Referring now to FIG. 6, one example of a system according to the present disclosure is illustrated in block diagrammatic/flowchart format.

A customer 310 contacts a call center 102 through direct telephone contact, interactive voice recording, through an on-screen user interface or through a website. The customer calls to register or de-register a portable device 36. The call center 102 is in communication with a billing center 104. A serial number of the product or other unique identifier is provided to the billing center 104 through the call center and ultimately the customer 310. The billing center 104 reviews the account information, and, if the portable device 36 is the first device for the account, generates a household seed. The household seed is provided once the device is registered to the head end 106. The portable device 36 may be restricted from moving/sharing content between households. Also, household seeds allow for license renewal in combination with a token without need of a back channel.

The head end 106 may be coupled to or store therein a certificate revocation list or simply a revocation list 320. The revocation list 320 may provide an indication as to whether the device is a banned or counterfeit device. The revocation list 320 may take the form of specific serial numbers or unique identifiers that have been associated with fraud with respect to a specific device or a model, or a software version. The revocation list may be provided to the head end 106, where authorization may be prevented or allowed. Authorization to the system is not provided for the particular portable device 36 if it is on the revocation list. Should the device not be on the revocation list, the head end 106 provides a household seed and an indication of the registered device to a broadcast management and uplink system 324. The revocation list may also be provided to each set top box 28 and a determination may be made at the set top box based on the revocation list.

The broadcast management and uplink system may provide secure time and license rules to the device through communication system 101 or satellites 18. A conditional access packet (CAP) may be provided with the serial number, the seed, the programming guide with revocation secure time and licensing rules. These features may be provided in one CAP or multiple CAPs. These are provided to the set top boxes 28A and 28B. In this example, more than one set top box is illustrated since authorization may be provided for each set top box or receiving device. Each set top box in this example includes an associated digital video recorder 32A and 32B.

The set top box adds the serial number to a list in memory therein, saves the household seed, the revocation lists, a secure time and a local license for the portable media player. Of course, not all of the items listed may be used in any one configuration. The set top boxes, thus, provide content along with licensing and expiration data encrypted with a content key and other subscriber data to the portable device 36.

Communication between the uplink system and the set top boxes may be performed securely using encryption or other security features. Likewise, communication between the set top boxes and the portable devices may be done in a secure manner. One type of encryption or security may be performed with a public key. The public key is provided by the portable device 36 and can be the same public key used in digital rights management (DRM). Link protection to uniquely identify the device can use the public key to encrypt a symmetric key for use in encrypting the communication.

Figure 7:
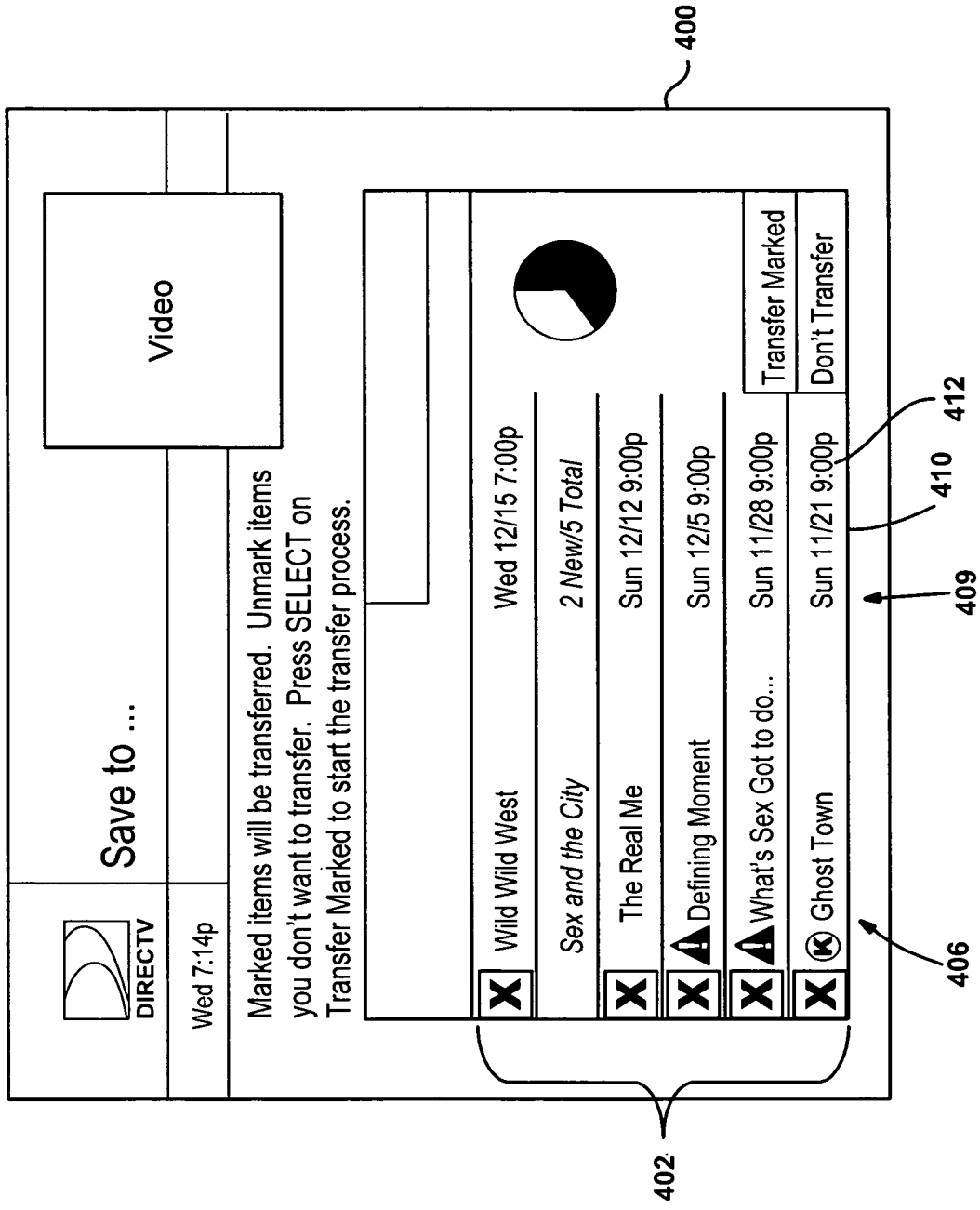
FIG. 7 is a screen display from a set top box to allow content to be played.

Referring now to FIG. 7, a screen display 400 associated with a display device 30 generated by a set top box of FIG. 1 is illustrated. The screen display 400 provides a means for selecting various files to be transferred to the portable device 36. As illustrated, a list of files 402 have an "x" before the name of each file a selection box 404. A user interface 80 such as that shown in FIG. 2, may be used for selecting and de-selecting various content. In addition to a name 406, a day 408, date 410 and time 412 associated with the file are set forth. The day, date and time may correspond to the start time of the original program. By selecting the various files, and coupling the portable device 36 to the set top box or other receiving device, the files may be transferred thereto. The menu may only be available when a portable device 36 is connected to the receiving device or storage device.

Figure 8:
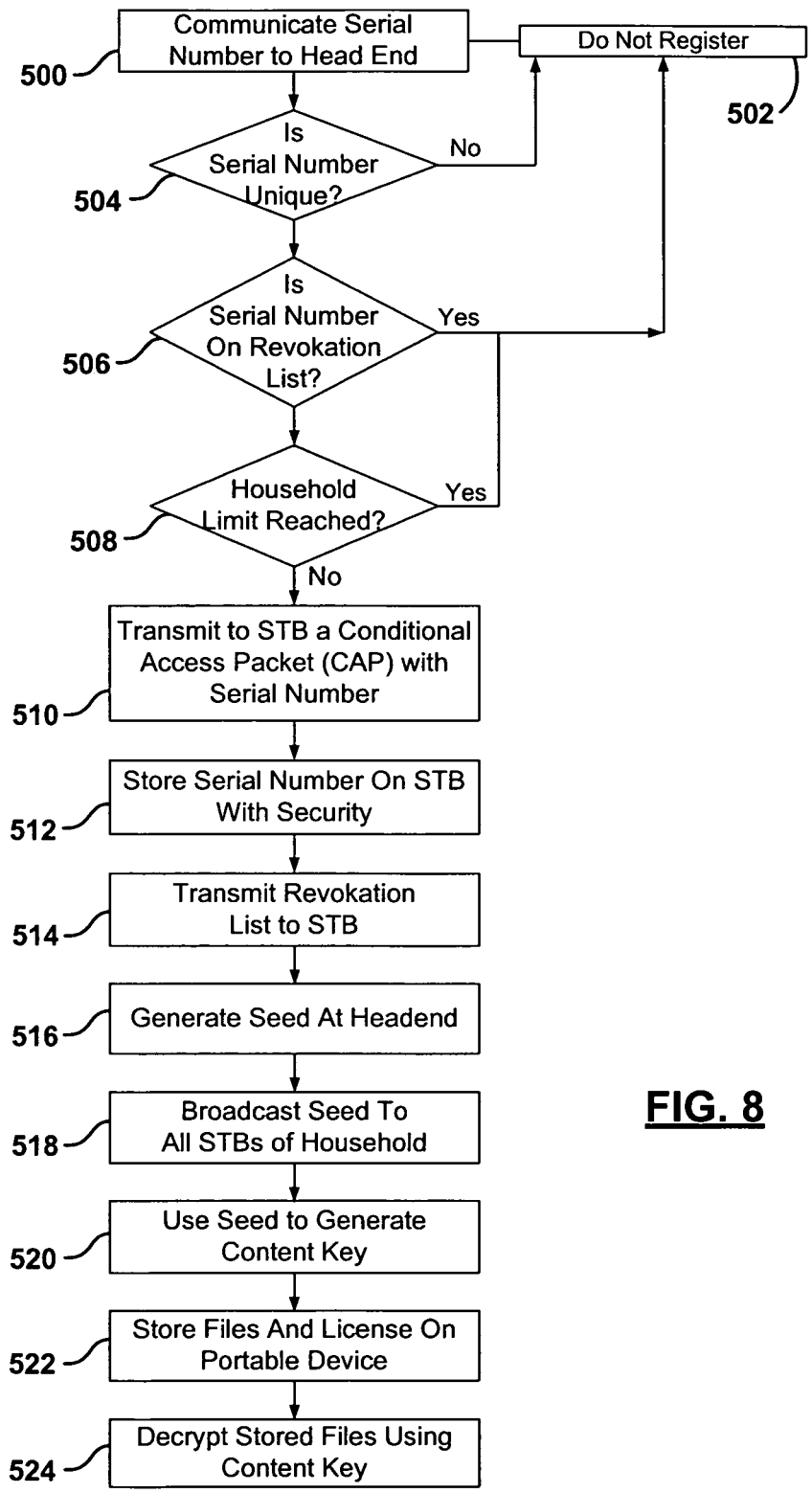
FIG. 8 is a flowchart illustrating a method of operating a system to allow a portable media player to save and playback satellite television content.

Referring now to FIG. 8, one method for operating the system during the registration process is illustrated. In box 500, the serial number of the portable device 36 or other unique identifier is communicated to the head end. As mentioned above, the serial number or unique identifier may be communicated in various manners including by direct customer input to a call center. This example will use a serial number as the unique identifier. Of course, other types of unique identifiers may be used. In step 502, if the serial identifier is not communicated to the head end, the device is not registered in 502. In step 504, if the serial number is not unique, step 502 does not provide a registration for the device. In step 506, if the serial number is on a revocation list, the device is also not registered with the system in step 502. As mentioned above, this step may be performed at the head end or the set top box 28 shown in FIG. 1.

After step 506, step 508 determines if a household limit has been reached. It may be desirable to provide a limit to the number of devices associated with a particular system. Therefore, if a household limit has been reached, step 502 does not register the device.

After step 508, if the household limit has not been reached, step 510 transmits a conditional access packet (CAP) with a serial number to the set top box. This may be performed securely. In step 512, the serial number is stored in the set top box with security. The security may take the form of a separate memory, encryption or the like. In step 514, the revocation list may be provided to the set top box. In step 516, a seed is generated at the head end and broadcast to all the set top boxes of the household of step 518. The seed is used to generate a content key in step 520. The content key may be distributed in a license in encrypted form. The content key may be a single symmetric key. Each payload packet may be encrypted with a different symmetric key. The data packet encryption key may be stored in encrypted form. The household seed and its derivatives are the same for all set top boxes in a household. Once all the security is in place, step 522 allows files to be stored on the portable device 36. In step 524, the stored files are decrypted using the content key.

Figure 9A:
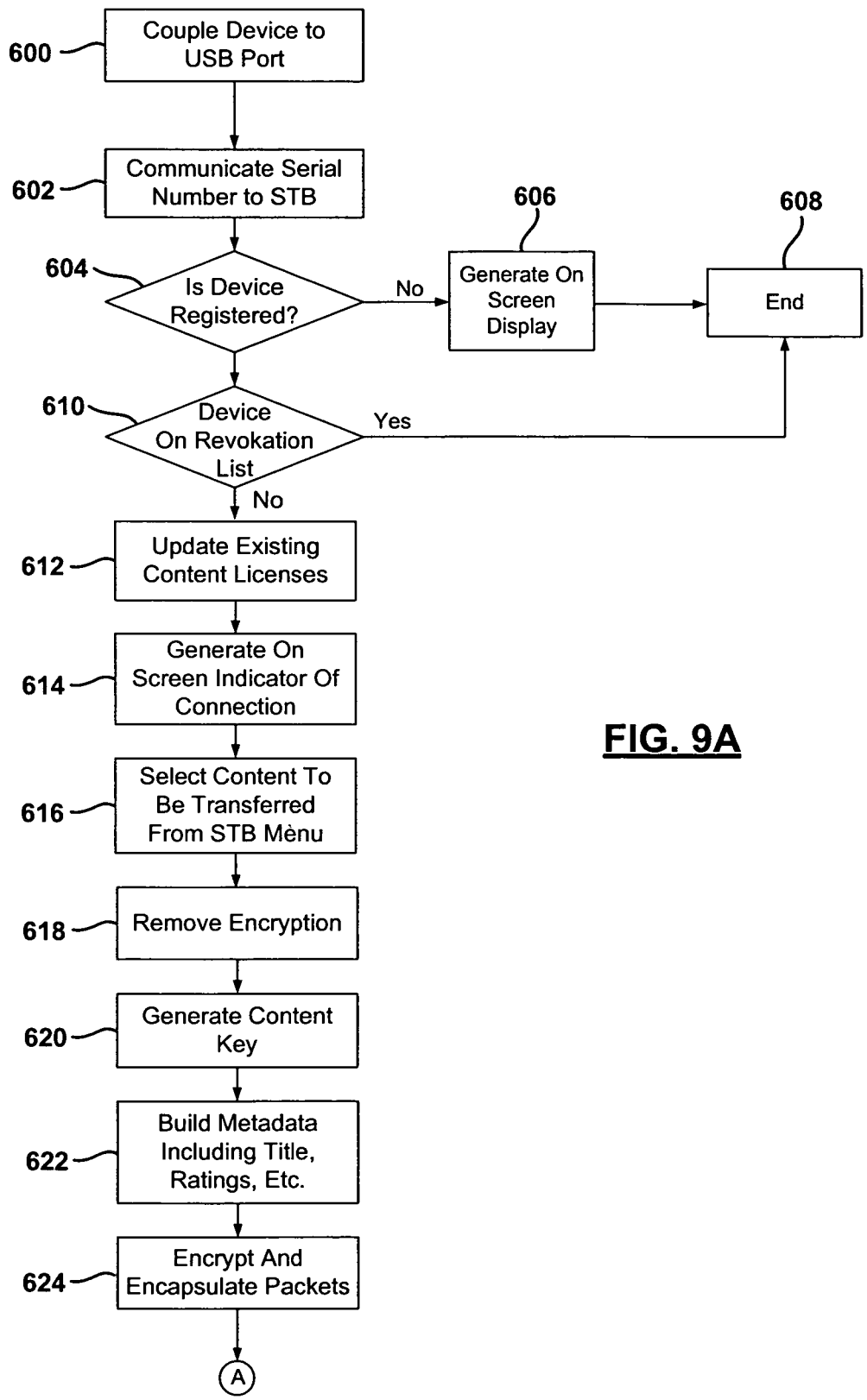
FIGS. 9A and 9B are a flowchart illustrating a method of operating a system to loading files onto the portable device.
Figure 9B:
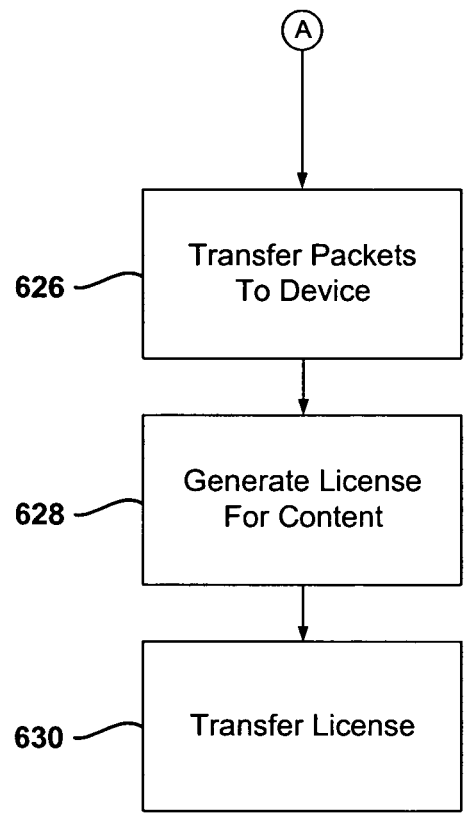

Referring now to FIGS. 9A and 9B, a method of operating the portable media player is illustrated. In step 600, the device is coupled to the receiving device through a USB port or the like. In step 602, a serial number is communicated to the receiving device or storage device such as a set top box or digital video recorder. If the device is not registered, in step 604, an on-screen display is provided in step 606 and the system ends in step 608. The on-screen display may be generated both on the screen of the device and on the screen of the display 30 associated with the receiving device. One or both displays may be activated. After step 604, if the device is registered, step 610 checks to determine whether the device is on a revocation list. If the device is on a revocation list in step 610, the system process ends in step 608.

In step 610, if the device is not on the revocation list, step 612 updates existing content licenses. Existing content licenses may be extended for various types of content. For example, a particular brand of file that is downloaded from a particular channel may have a limited time such as five days. Once the device is recoupled to the receiving device, the time may again be extended for another five days. If the current subscriber is no longer a subscriber to the particular channel, then the license is not extended.

Specific licenses may be updated based on existing tokens (embedded within the content) on the portable media player or as an alternative all licenses on the device may be updated without requesting information (tokens) from the device.

After step 612, step 614 generates an on-screen indicator of the connection. In step 616, content is selected through the receiving device such as a set top box menu. In step 618, DirecTV encryption may be removed. A content key is generated in step 620. Metatags including titles, ratings, times and other information may be created in step 622. In step 624, the packets or segments of data may be encapsulated and encrypted. In step 626, the packets are transferred to the device. In step 628, a license for generating content is generated. In step 630, the license is transferred to the device.

Figure 10:
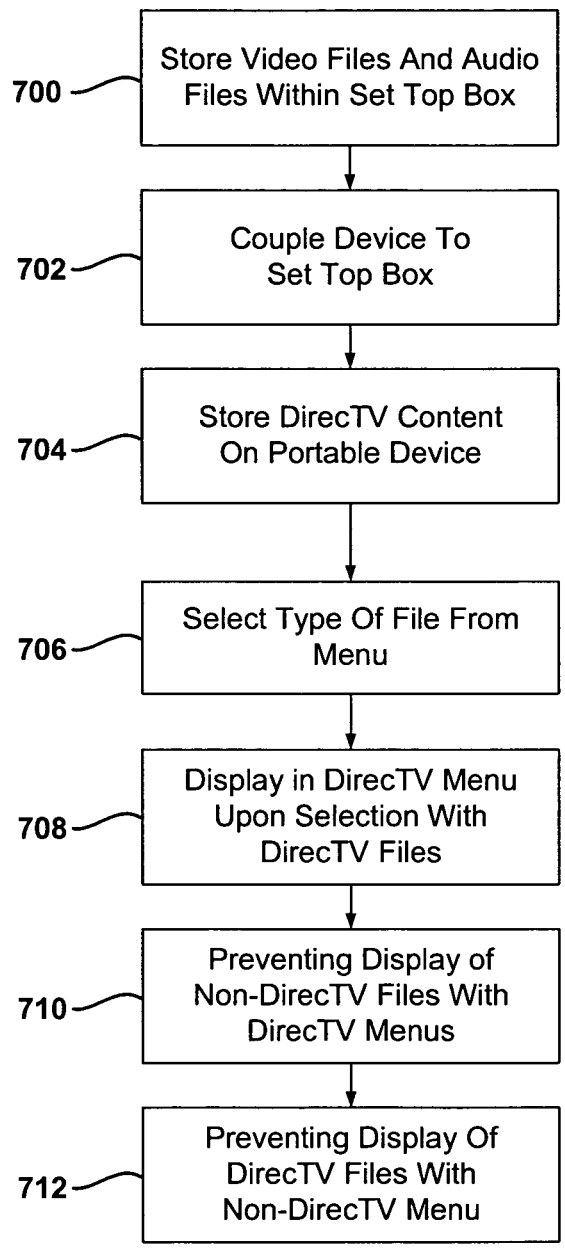
FIG. 10 is a flowchart illustrating a method of playing back files stored on the portable media player.

Referring now to FIG. 10, a method of transferring files from a set top box or other receiving device to a portable device 36 is described. In step 700, video files and audio files are stored within the set top box. In step 702, the portable device 36 is coupled to the set top box using one of the above methods. In step 704, DirecTV or other specific type or branded content or other formatted content is stored on the portable device 36. In step 706, the type of file is selected from a menu. In step 708, the device displays the DirecTV or other special formatted files upon selection of a DirecTV icon or similar descriptor. In step 710, files with non-DirecTV formats are prevented from being displayed with the DirecTV menu. In step 712, display of DirecTV files with non-DirecTV menus, is also prevented. This allows the specific files such as the DirecTV files to be located in one specific area to enhance the user experience. For example, regular file-sharing screen displays may be displayed in the directories other than DirecTV's. In a DirecTV directory, the files may be displayed in a distinct menu-type format typically associated with the brand.

Figure 11:
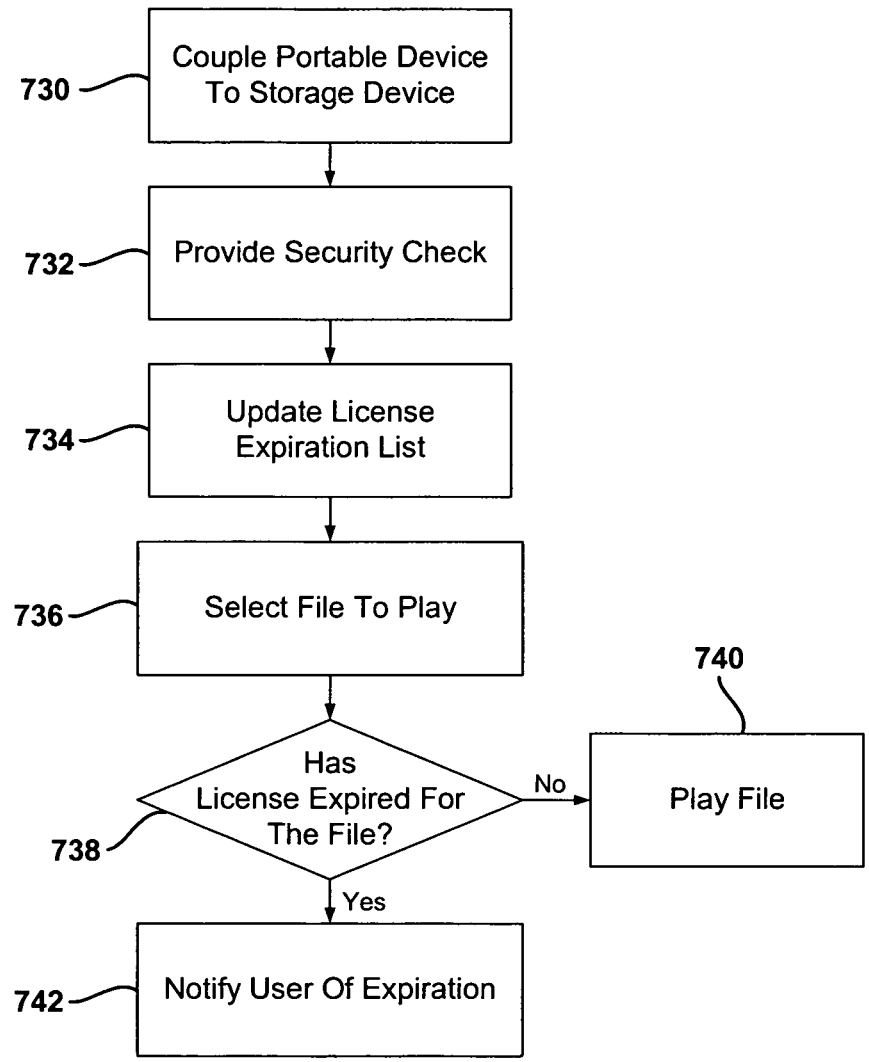
FIG. 11 is a flow chart illustrating a method of operating a system to transfer and playback files with appropriate licensing rights.

Referring now to FIG. 11, a method of playing back a file is set forth. In step 730, a portable device 36 is coupled to a storage device. In step 732, a security check is performed. In step 734, a license expiration list is updated. In step 736, the file is selected to play in the portable device 36. In step 738, if the license has not expired for the file, the clip or file is played in step 740. In step 742, if the license has expired for the file, the user is notified of the expiration.

It should be noted that licenses may change if a subscription to a particular premium channel has expired or a time limit from the file has been reached. Other conditions may also contribute to the file expiring.

Figure 12:
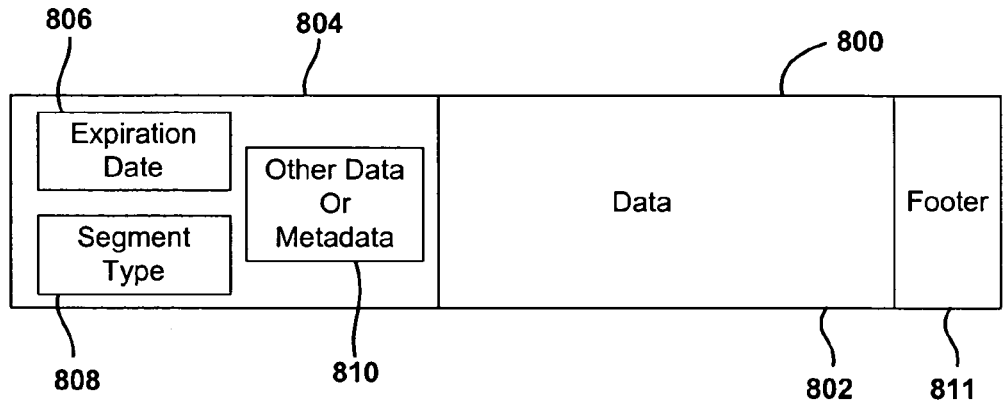
FIG. 12 is a diagrammatic representation of a file segment, a plurality of which is used to form a file.

Referring now to FIG. 12, a representation of a file segment 800 is illustrated. A particular file may be composed of many segments. The segments may correspond to various portions of a broadcast show. For example, each commercial, the beginning, the ending may all be separate segments. A file segment or simple segment is a subportion of a complete file. File segment 800 has a data portion 802 and a header portion 804. The header portion 804 may include various types of identifying information including an expiration date of the data 806, a segment type 808 and other types of data or metadata 810. A footer may also include the identifying information. The footer may also be a file type extension used in storing the segment in the memory of the portable device 36. Other types of data or metadata may include the channel from which the file originated, the date, the time, the rating, payload size (of the packet of information), bit rate, the time per frame, an MPEG profile. Both the audio and video may include various types of metadata.

Figure 13:
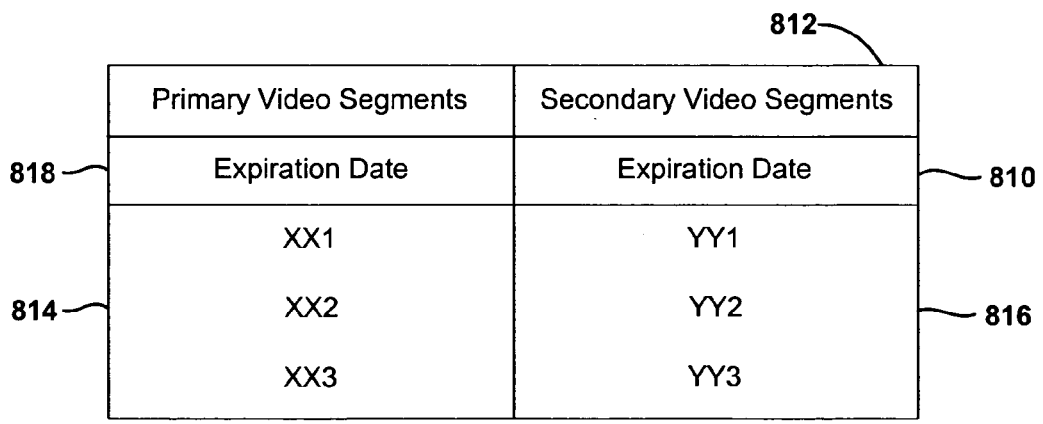
FIG. 13 is a table illustrating a potential storage scheme for video segments.

Referring now to FIG. 13, the various video segments may be stored in a table, directory or linked list 812. Primary video segments may be stored in column 814 and secondary video segments may be stored in column 816. The primary video segment column may include an expiration date 818 as well as various segments illustrated by XX1, XX2, and XX3. The secondary video segments column 812 may also include an expiration date 820 and various video segments including YY1, YY2, and YY3. A video or a file may be comprised of various primary video segments and secondary video segments. The secondary video segment may include many things including a program ending, a news portion, a commercial, or other information. The secondary video segments may be updated as will be further described below.

Figure 14:
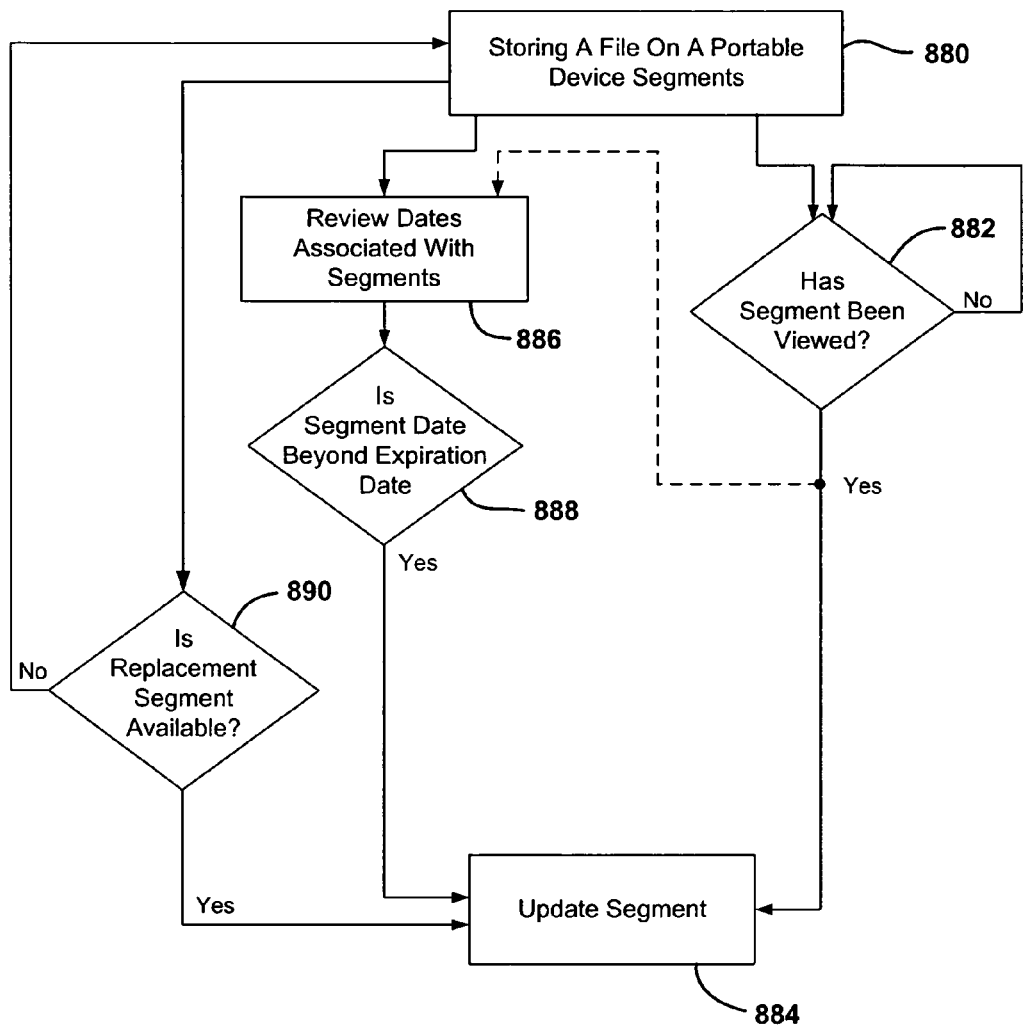
FIG. 14 is a flowchart for a method of updating a segment.

Referring now to FIG. 14, a method for updating various segments is illustrated. In step 880, a file is stored on the portable device 36 in various segments. Various methods or combinations of methods may be used for updating the segments. In step 882, if the segment has not been viewed, the segment is again checked. If the segment has been viewed, the video segment is updated in step 884. Thus, only after a segment has been viewed may the segment be updated. However, other information may be time-sensitive and, thus, may also be changed. Thus, after step 880 or 882, the dates associated with the segments are reviewed in step 886. If the segment date is beyond the expiration date in step 888, step 884 is again performed which updates the segment. A dotted line between the output of block 882 and 886 illustrates that both a segment viewing and a date may be considered.

Referring back to step 880, if the replacement segment is available in step 890, the segment is updated in step 884. That is, the segments may be updated any time a segment is available. The segment is available when the portable device 36 is coupled to the receiving device or the set top box. Of course, step 890 may also be used in connection with steps 888 and 882. That is, both viewing and an expiration may be a requirement for updating the segment.

Figure 15:
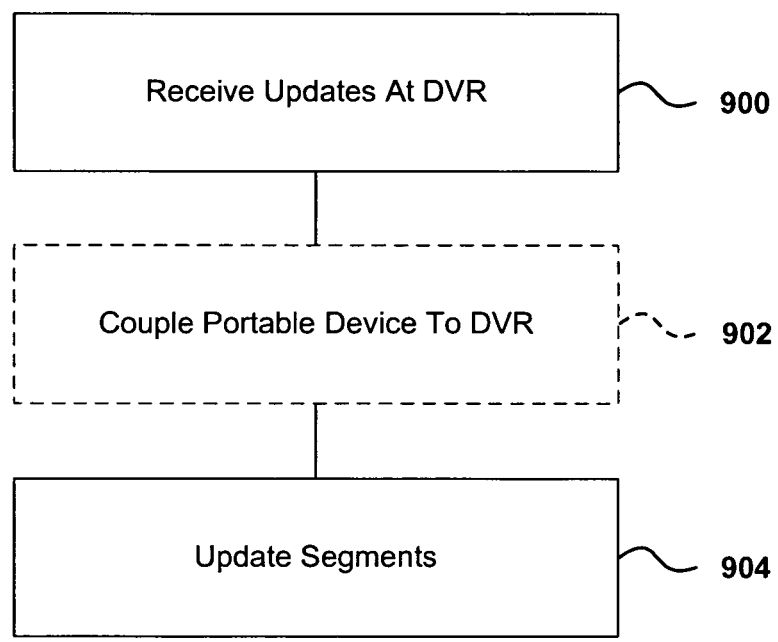
FIG. 15 is a high level flowchart for a method of updating a video segment.

Referring now to FIG. 15, in step 900 updates are received at the set top box digital video recorder. In step 902, an optional step of coupling the portable device 36 to the DVR is set forth. In step 904, the various segments are updated according to the method illustrated in FIG. 14.

Figure 16:
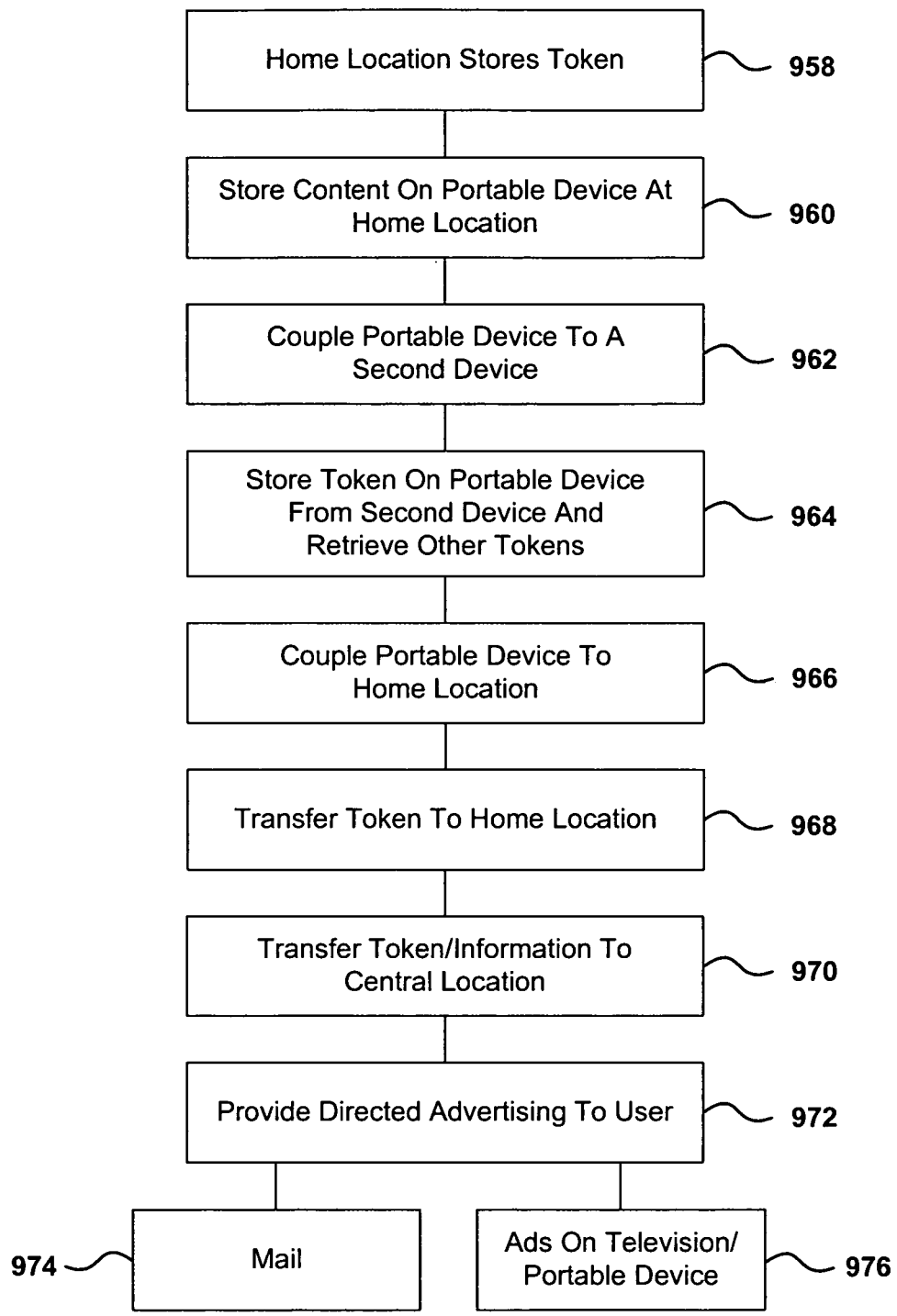
FIG. 16 is a flowchart for directing advertising to a system owner.

Referring now to FIG. 16, a method for providing targeted advertising is set forth. In step 958, the home location stores tokens. In step 960, content is stored on the portable device 36 at a home location. In step 962, the portable device 36 is coupled to a second device such as a second set top box for playback therethrough. In step 964, a token or type of identifier is stored on the portable device 36 from the second device. The token may include an identification of the second set top box. The token may be a digital file. Other information in the form of other tokens may include the time or other information about the interaction between the portable device 36 and the second set top box. In step 966, the portable device 36 is coupled to the home location and the token is transferred to the home location set top box in step 968. In step 970, the token and/or the information therewith is transferred to a central location. In step 972, the advertising is directed to a user by way of mail in response to the token in step 974 or advertising for the portable device 36 in step 976. Selective adds may also be played back through the home set top box.

This method is suitable for providing directed advertising. For example, if a friend's device is the second device, information may be provided about features that the second device or a friend's device includes. As mentioned above, targeted mailers may be provided or specific adds or add segments may be provided.

While particular embodiments of the disclosure have been shown and described, numerous variations and alternate embodiments will occur to those skilled in the art. Accordingly, it is intended that the disclosure be limited only in terms of the appended claims.

What is claimed is:

1. A method comprising:
   electronically receiving, a set top box, license data from a head end, said license data corresponding to a valid subscription for a content file;
   electronically receiving, using the set top box, a list from the head end, the list including identifiers of portable devices that are not authorized to receive content files;
   electronically coupling a portable device to the set top box at a first time, using the portable device and the set to box the set to box being separate from the portable device, wherein the set top box has the content file therein;
   electronically receiving, using the set top box, an identifier of the portable device;
   in response to a determination that the identifier of the portable device is not included in the list of identifiers of portable devices that are not authorized to receive content files, electronically communicating, using the set top box, the content file to the portable device;
   using the portable device, electronically storing the content file within the portable device;
   using the portable device, electronically storing the license data within the portable device;
   thereafter, using the portable device, enabling access to the content file on the portable device based on the license data;
   electronically coupling, using the portable device and the set top box, the portable device to the set top box at a second time after the first time;
   in response to coupling at the second time, electronically communicating, using the set top box, updated license data to the portable device; and
   electronically storing, using the portable device, the updated license data for the content file in the portable device.

2. A method of claim 1 further comprising:
   updating licensing rights at the portable device when license rights have not expired.

3. A method of claim 1 wherein the portable device comprises a portable media player.

4. A method of claim 1 further comprising:
   after the step of coupling a portable device to a storage device separate from the portable device at a first time:
   selecting the content file from the storage device;
   removing a first encryption associated with the content file;
   associating a second encryption to the content file; and
   wherein storing the content file comprises storing the content file with the second encryption in the portable device.

5. A method of claim 1 communicating a secure time to the portable device.

6. A method of claim 1 wherein the portable device comprises a computer.

7. A method of claim 1 wherein the storage device comprises a digital video recorder.

8. A method of claim 1 further comprising selecting the content file for playback from a menu displayed on the portable device.

9. A method of claim 1 wherein the content file has a first file type, wherein the license expiration time corresponds to the first file type.

10. A system for storing a content file on a portable device comprising:
    a display;
    a digital video recorder and a first control device;
    a controller coupled to the digital video recorder; and
    wherein said controller generates a screen display having a selector for selecting the content file to transfer to the portable device, the controller connects to the portable device at a first time, the controller receives a list from the head end, the list including identifiers of portable devices that are not authorized to receive content files, and the controller receives an identifier of the portable device;
    wherein when the content file is selected for transfer and the identifier of the portable device is not included in the list of identifiers of portable devices that are not authorized to receive content files, the controller stores the content file and license data for the content file in a memory of the portable device;
    wherein the portable device enables access to the content file on the portable device based on the license data; and
    wherein the controller connects to the portable device at a second time after the first time, and stores updated license data in the memory of the portable device.

11. A system as recited in claim 10 wherein license data comprises a license expiration time.

12. A system as recited in claim 11 wherein the license expiration time is dependent upon the content file.

13. A system as recited in claim 10 wherein license information comprises an updated license expiration time on a second file stored on the portable device.

14. A system as in claim 10 wherein the portable device comprises a portable media player.

15. A system as recited in claim 10 wherein the portable device comprises a computer.

* * * * *